(12) United States Patent
Workman et al.

(10) Patent No.: US 6,709,020 B2
(45) Date of Patent: Mar. 23, 2004

(54) STABILIZER ELBOW LOCK

(75) Inventors: Larry Workman, Jackson, TN (US); David Allen McAllister, Memphis, TN (US)

(73) Assignee: Lasco Fittings, Inc., Brownsville, TN (US)

( * ) Notice: Subject to any disclaimer, the term of this patent is extended or adjusted under 35 U.S.C. 154(b) by 0 days.

(21) Appl. No.: 10/043,049

(22) Filed: Jan. 9, 2002

(65) Prior Publication Data
US 2003/0127849 A1 Jul. 10, 2003

(51) Int. Cl.$^7$ ................................................ F16L 35/00
(52) U.S. Cl. ........................ 285/80; 285/92; 285/79; 285/179
(58) Field of Search ...................... 285/92, 80, 45, 285/79, 179, 5; 70/175–180; 137/383, 385

(56) References Cited

U.S. PATENT DOCUMENTS

| 315,895 | A | * | 4/1885 | Brady | 411/120 |
|---|---|---|---|---|---|
| 3,511,524 | A | * | 5/1970 | Ford et al. | 285/30 |
| 4,458,923 | A | * | 7/1984 | Burroughs | 285/8 |
| 4,993,260 | A | * | 2/1991 | Bednarz | 73/201 |
| 5,022,661 | A | * | 6/1991 | La Gasse et al. | 222/153 |
| 5,266,740 | A | * | 11/1993 | Hsu | 174/72 |
| 5,348,349 | A | * | 9/1994 | Sloane | 285/92 |
| 5,853,200 | A | * | 12/1998 | Zieres | 285/45 |

* cited by examiner

*Primary Examiner*—David Bagnell
*Assistant Examiner*—Giovanna Collins
(74) *Attorney, Agent, or Firm*—Calfee, Halter & Griswold LLP

(57) ABSTRACT

A stabilizer elbow lock that prevents a seal between a stabilizer elbow and a coupler valve from being broken by engaging at least a portion of the stabilizer elbow and by engaging at least a portion of the coupler valve. In an alternative embodiment, one or more adapters are provided that interface between the lock and the coupler valve and/or interface between the lock and the elbow.

33 Claims, 10 Drawing Sheets

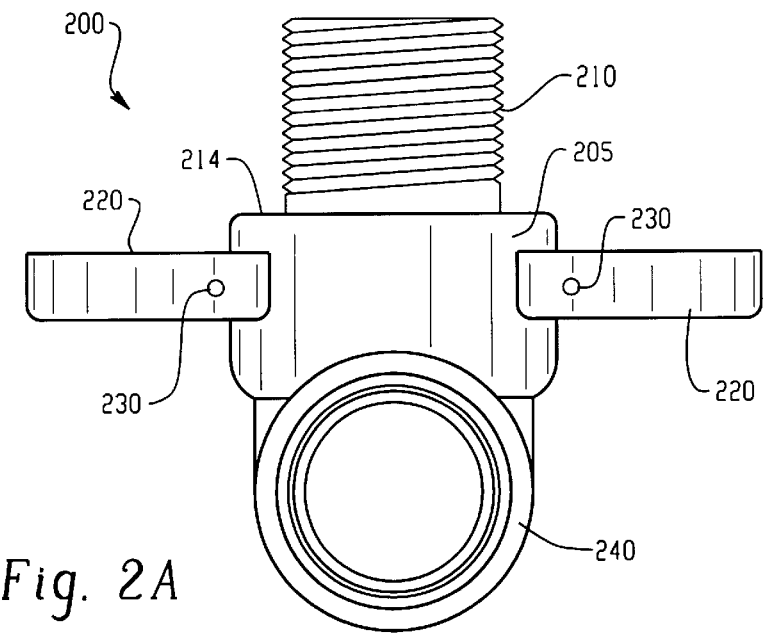
Fig. 2A
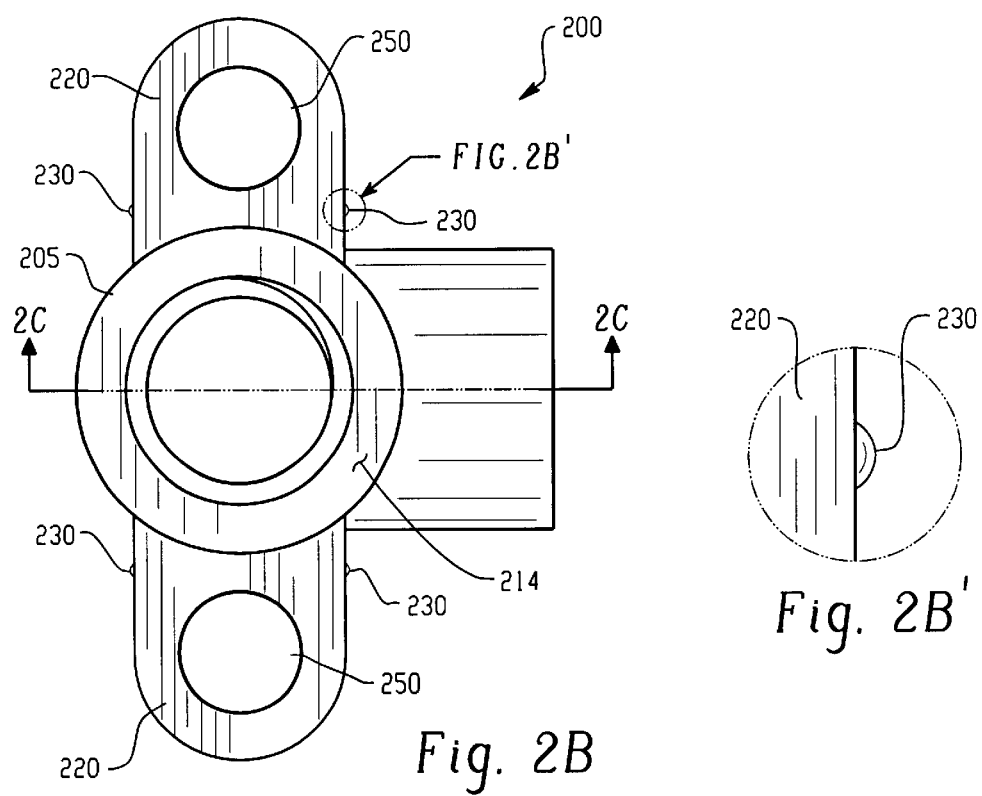
Fig. 2B
Fig. 2B'

Fig. 3C"

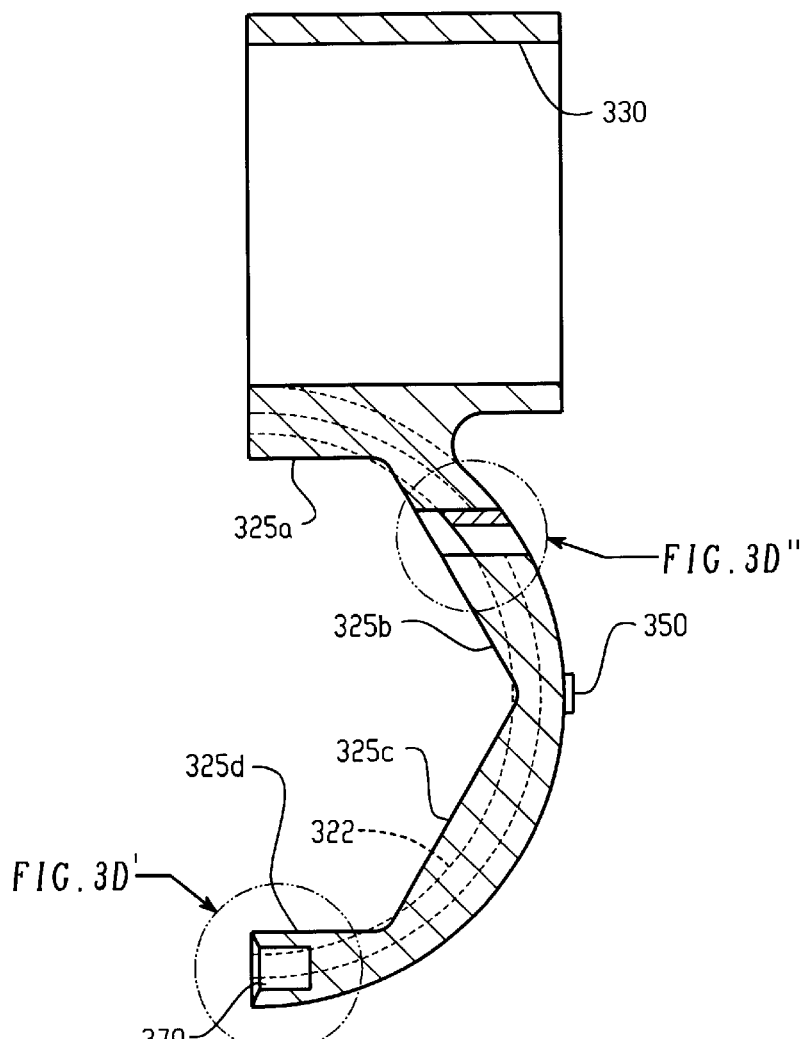
Fig. 3D
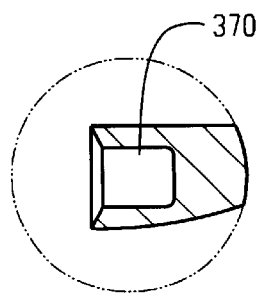
Fig. 3D'
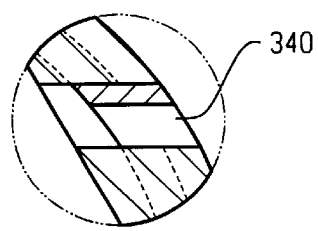
Fig. 3D"

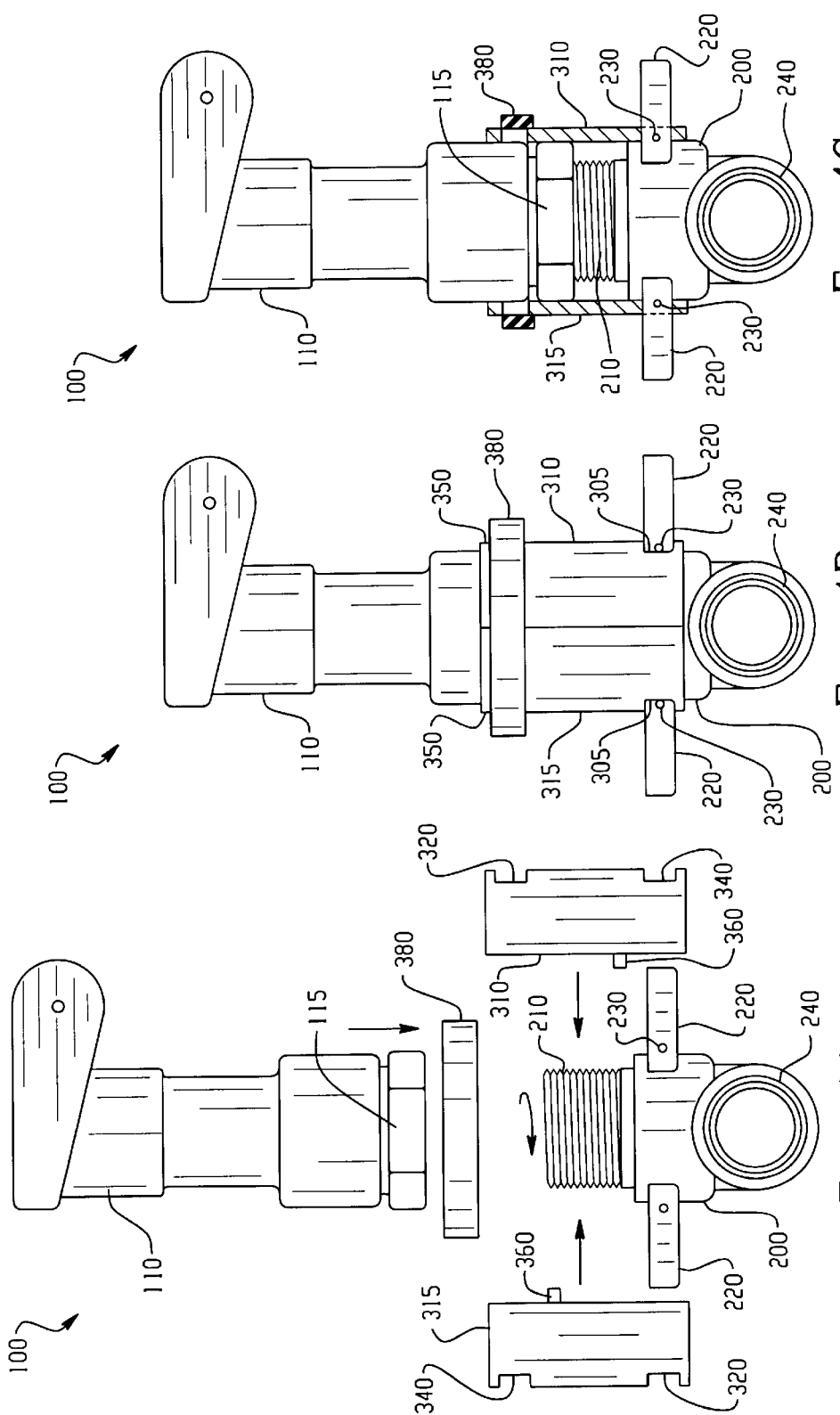

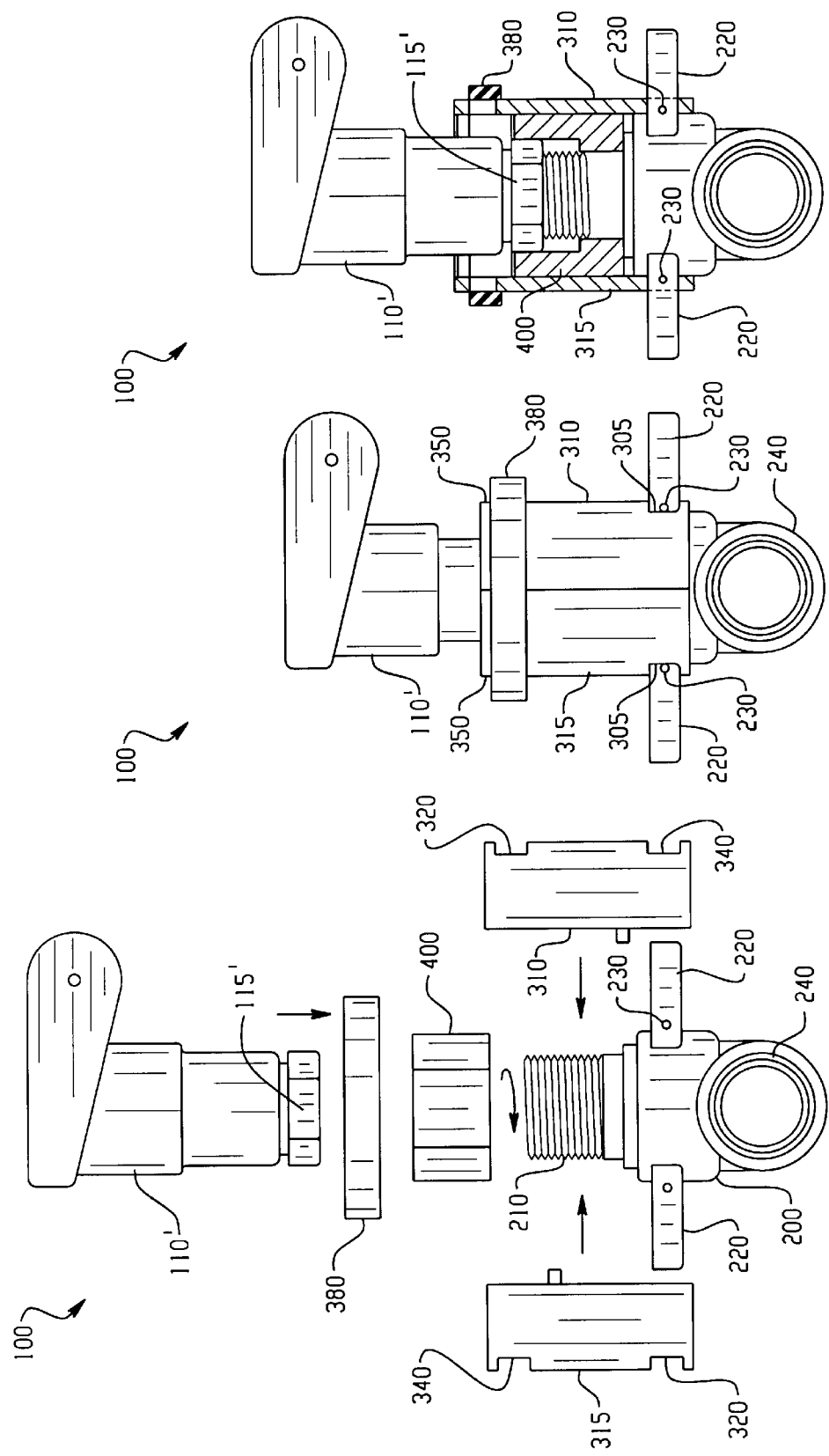

STABILIZER ELBOW LOCK

FIELD OF THE INVENTION

The present invention relates generally to the field of irrigation, and more specifically to a stabilizer elbow lock that prevents underground quick disconnect valve couplings from being worked loose over time by repeatedly being activated by a sharp blow, as by a kick, which is typically used to open the valve.

BACKGROUND OF THE INVENTION

Irrigation systems, e.g., golf course irrigation systems, typically have a number of specialized components to facilitate specific irrigation tasks. For example, for irrigation of golf course tees and golf course greens, there is typically provided an underground valve assembly to which grounds keepers connect a hose that is used to water the tee or the green. This valve assembly typically is buried under the ground and has a quick disconnect type coupling connected thereto that is connected by threads to a threaded stabilizer elbow to which a water pipe is connected. The stabilizer elbow tends to keep the valve in one place under the ground and typically has a pair of stabilizing flanges extending therefrom. Typically a hose is provided having a quick disconnect coupling at one end that includes a rigid physical extension, e.g., either an "L" bend or a "T" bend. The ground crew member typically opens a valve cover, revealing the quick disconnect portion of the valve assembly, couples the quick disconnect portion of the hose to the quick disconnect portion of the valve assembly, and strikes, e.g., kicks, the physical extension (either the "L" or one end of the "T") causing the valve to rotate in one direction and open, thereby providing a flow of water from the water pipe through the valve and through the hose for irrigation. After using the hose for irrigation, the ground crew member typically pushes the physical extension (either the "L" or one end of the "T") on the opposite side, causing the valve to rotate in the opposite direction and close, thereby cutting off the flow of water from the water pipe, uncouples the quick disconnect portion of the hose from the quick disconnect portion of the valve assembly, and closes the valve cover.

Unfortunately, the act of repeatedly opening the valve by striking, e.g., kicking, the rigid hose extension tends to allow the valve to work loose, disconnecting the valve from the elbow to which it is connected. Over time, the seal between the valve and the elbow is broken, thereby allowing water to leak, which can have undesirable consequences, e.g., erosion of a sink hole under a golf tee or green that can be expensive to repair and that can be so large so as to be dangerous to golfers.

Certain innovative contractors have attempted to solve this problem by securing a length of rebar or a length of 2×4 or a length of pipe to the valve, e.g., by wrapping nylon tape around them, or by securing a length of pipe or a length of slotted angle iron to the valve with a U-bolt or a muffler clamp. These attempts to solve this problem are not satisfactory for various reasons.

There is a need, therefore, for an improved coupling between a quick disconnect valve and the stabilizer elbow to which it is connected.

SUMMARY OF THE INVENTION

The present invention is directed toward a lock that can be used to prevent a quick disconnect coupling valve from being unthreaded from the elbow to which it is connected.

In a broad sense, the lock of the present invention is a lock to prevent a seal between a coupler valve and a fitting from being broken, the coupler valve having at least one coupler valve surface and the fitting having at least one fitting surface. In this context, the lock comprises at least one locking member having a first portion shaped to engage at least a portion of the at least one coupler valve surface and a second portion shaped to engage at least a portion of the at least one fitting surface, the first and second portions cooperating to prevent relative motion between the coupler valve and the fitting sufficient to break the seal between the coupler valve and the fitting.

One implementation of the lock of the present invention is a lock to prevent a seal between a coupler valve and a stabilizer elbow from being broken, the coupler valve having at least one nut-shaped portion and the stabilizer elbow having at least one stabilizer structure extending therefrom. In this embodiment, the lock comprises first and second locking members having a first portion shaped to engage the at least one nut-shaped portion of the coupler valve and a second portion having an opening through which the at least one stabilizer structure of the stabilizer elbow extends and a retaining ring for engaging the first locking member and the second locking member allowing the first and second locking members to cooperate to prevent relative rotational motion between the coupler valve and the stabilizer elbow sufficient to break the seal between the coupler valve and the stabilizer elbow.

Additionally, the locking members can have optional structures such as one or more stabilizing structures that adds positional stability to the coupler valve when installed, such as an anti-rotational collar.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention, wherein:

FIG. 2A is a front view of the stabilizer elbow;

FIG. 2B is a top view of the stabilizer elbow shown in FIG. 2A, with FIG. 2B' providing additional details thereof;

FIG. 3D is a sectional view of the locking member taken along the section line 3D—3D in FIG. 3B, with FIGS. 3D' and 3D" providing additional details thereof;

FIG. 4A is an exploded front view of the swing joint assembly and stabilizer elbow lock shown in FIG. 1;

FIG. 4B is a front view of the swing joint assembly and stabilizer elbow lock shown in FIGS. 1 and 4A, as assembled;

FIG. 4C is a front view of the swing joint assembly and stabilizer elbow lock shown in FIGS. 1, 4A, and 4B, showing the stabilizer elbow lock shown in cross-section.

FIG. 5A is an exploded front view of a swing joint assembly and stabilizer elbow lock according to a second embodiment of the present invention, illustrating use of the stabilizer elbow lock a coupler valve of a different size by using an adapter;

FIG. 5B is a front view of the swing joint assembly, stabilizer elbow lock, and adapter shown in FIG. 5A, as assembled;

FIG. 5C is a front view of the swing joint assembly, stabilizer elbow lock, and adapter shown in FIGS. 5A and 5B, showing the stabilizer elbow lock and adapter shown in cross-section.

DETAILED DESCRIPTION OF THE INVENTION

The present invention provides an apparatus for stabilizing a swing joint assembly. A swing joint assembly typically includes a quick coupler valve (or other coupler valve), a swing joint outlet (or other elbow), a swing arm, and a street elbow. These components form a unit that is part of a larger irrigation system, most of which is buried, that provides water to facilities such as parks and golf courses. The apparatus of the present invention preferably but not necessarily includes a modified stabilizer elbow and a locking subassembly (or "lock") that both prevents the coupler valve from becoming inadvertently loosened or detached from the swing joint outlet and also preferably but not necessarily provides positional stability to the entire assembly once it has been buried in the ground.

In a broad sense, the lock according to the present invention preferably engages at least a portion of a coupler valve and engages at least a portion of an elbow to which the valve is connected to prevent from becoming inadvertently loosened or detached from the elbow. From a different perspective, the lock according to the present invention preferably engages at least a portion of a coupler valve and engages at least a portion of an elbow to which the valve is connected to prevent the seal between the coupler valve and the elbow from breaking, thereby preventing water from leaking between the coupler valve and the elbow. Preferably, a first portion of the interior surface of the lock is shaped to match the shape of a portion of the coupler valve and a second portion of the interior surface of the lock is shaped to match the shape of a portion of the elbow. If the elbow is a stabilizer elbow having one or more stabilizing structures extending therefrom, a portion of the lock is preferably shaped to accept one or more of the stabilizing structures.

Figure 1:
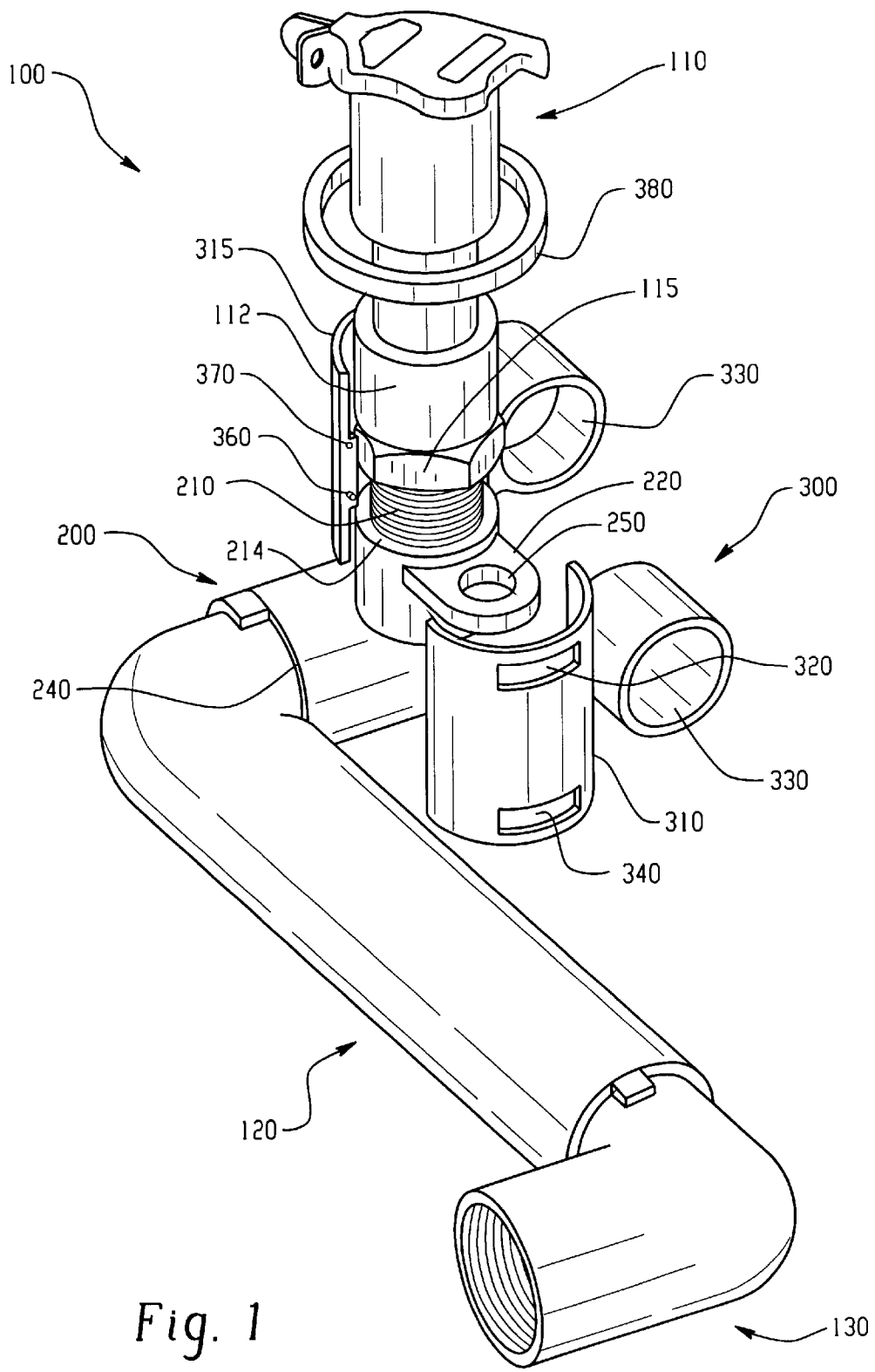
FIG. 1 is a perspective view of a swing joint assembly with a stabilizer elbow lock according to a first embodiment of the present invention, including a coupler valve, a stabilizer elbow, the stabilizer elbow lock according to a first embodiment of the present invention (shown disassembled), a swing arm, and a street elbow.

With reference now to the drawings and initially to FIG. 1, swing joint assembly 100 (see also FIGS. 4A–4C, and 5A–5C) is shown having a quick coupler valve 110 threadably attached to stabilizer elbow 200 (see also FIGS. 2A–2D). Stabilizer elbow 200 is also known to those skilled in the art as a "swing joint outlet." In FIG. 1, stabilizer elbow 200 is threadably connected to swing arm 120, and swing arm 120 is threadably connected to street elbow 130, although other configurations are used. The embodiment of the locking assembly ("lock") 300 shown in the figures (see also FIGS. 3A–3D) partially surrounds coupler valve 110 and stabilizer elbow 200, and is shown partially assembled in FIG. 1.

Figure 2C:
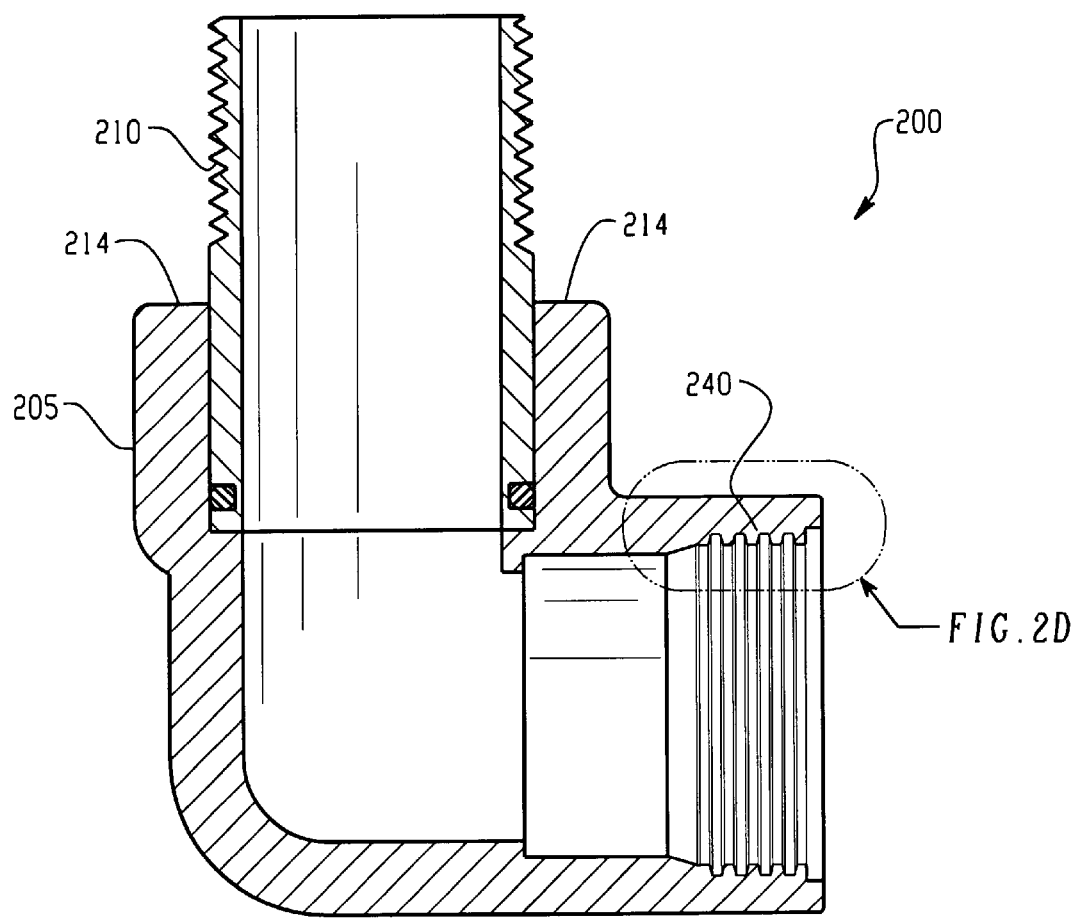
FIG. 2C is a sectional view of the stabilizer elbow shown in FIG. 2B taken along the section line 2C—2C in FIG. 2B.
Figure 2D:
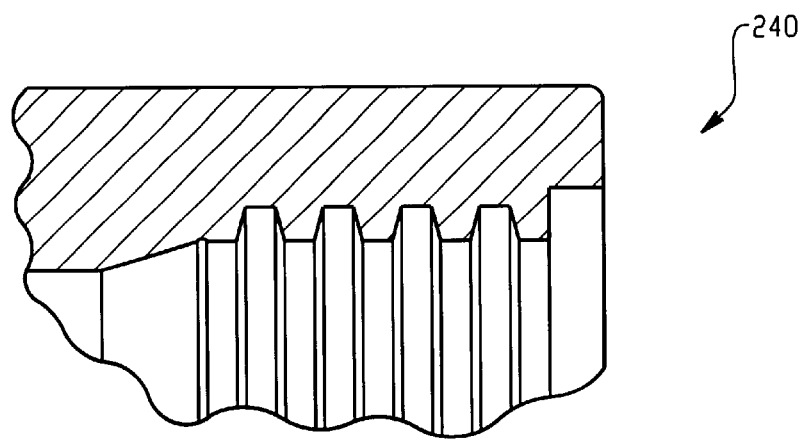
FIG. 2D is a sectional view showing the detail of the threaded portion of the stabilizer elbow shown in FIG. 2B.

With reference to FIGS. 2A–2D, stabilizer elbow 200 preferably includes body portion 205 threaded nipple 210, at least one stabilizing wing 220, bumps 230, and threaded connector 240, also known as a "swing arm connector" 240. Threaded nipple 210 is affixed to, e.g., threadably connected to or otherwise embedded into the material of, body portion 205 of stabilizer elbow 200. In the embodiment of stabilizer elbow 200 shown in the figures, a pair of stabilizing wings 220 are mounted opposite one another and extend outward from both sides of body portion 205 of stabilizer elbow 200. Bumps 230 are preferably a section of a sphere and are preferably located on the front and back of both stabilizing wings 220. Bumps 230 are preferably sized and positioned to engage an edge or surface, e.g., edge 305 of first and second locking members 310, 315, so as to removably secure first locking member 310 and second locking member 315 to stabilizer elbow 200 while locking subassembly 300 is being assembled. The bumps 230 more preferably extend about 0.025 inches from the surfaces of wings 220. Threaded swing arm connector 240 threadably receives swing arm 120. As shown in FIG. 2B, which is a top view of stabilizer elbow 200, each stabilizing wing 220 preferably includes an aperture 250 which extends completely through the material of each stabilizing wing 220. Each aperture 250 can receive a stabilizing rod (not shown), such as rebar, for enhancing the positional stability of swing joint assembly 100 once the assembly has been installed as part of an irrigation system. The stabilizer elbow shown in FIGS. 2A–2D was in the prior art prior to the present invention being made, with the exception that the bumps 230 were not included as part of the prior art stabilizer wings and were added thereto in accordance with the present invention.

Figure 3A:
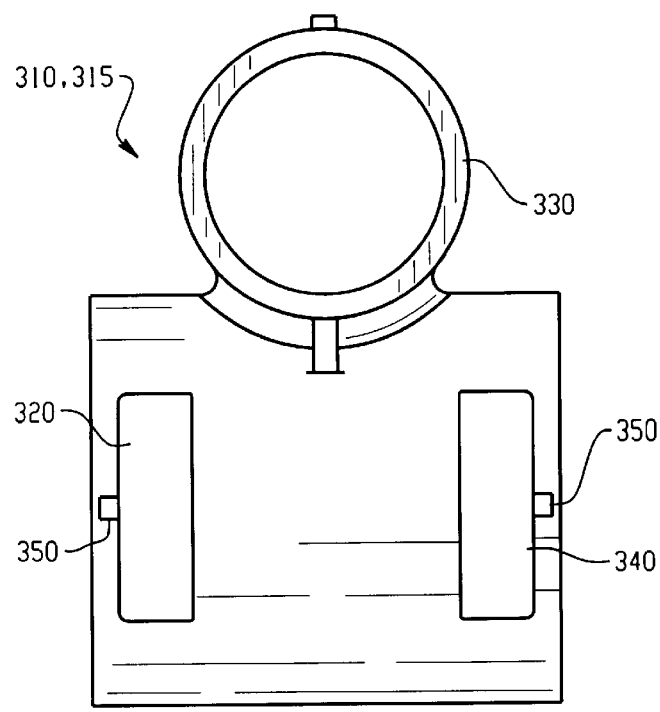
FIG. 3A is a side view of the exterior of one locking member of a pair of locking members that form a stabilizer elbow lock according to a first embodiment of the present invention.
Figure 3B:
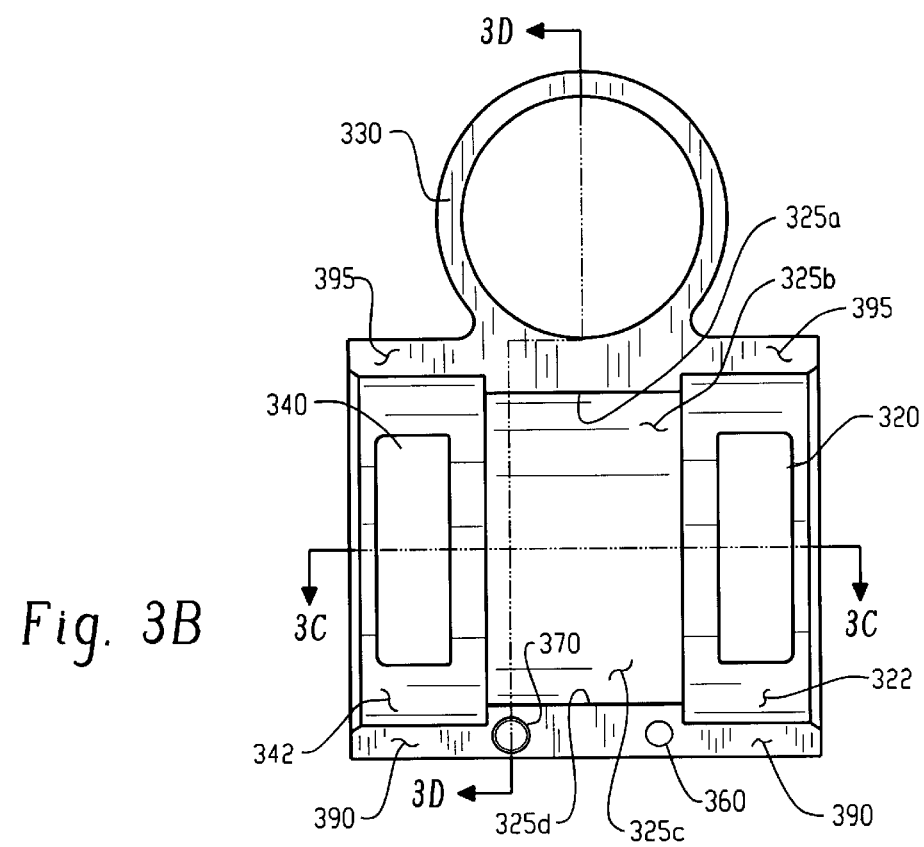
FIG. 3B is a side view of the interior of the locking member shown in FIG. 3A.
Figure 3C:
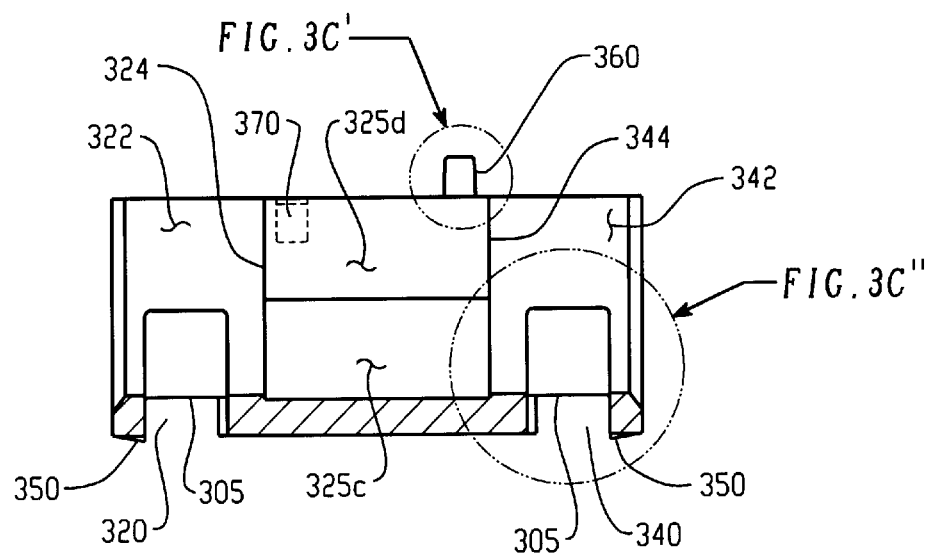
FIG. 3C is a sectional view of the locking member taken along the section line 3C—3C in FIG. 3B, with FIGS. 3C' and 3C" providing additional details thereof.
Figure 3C:
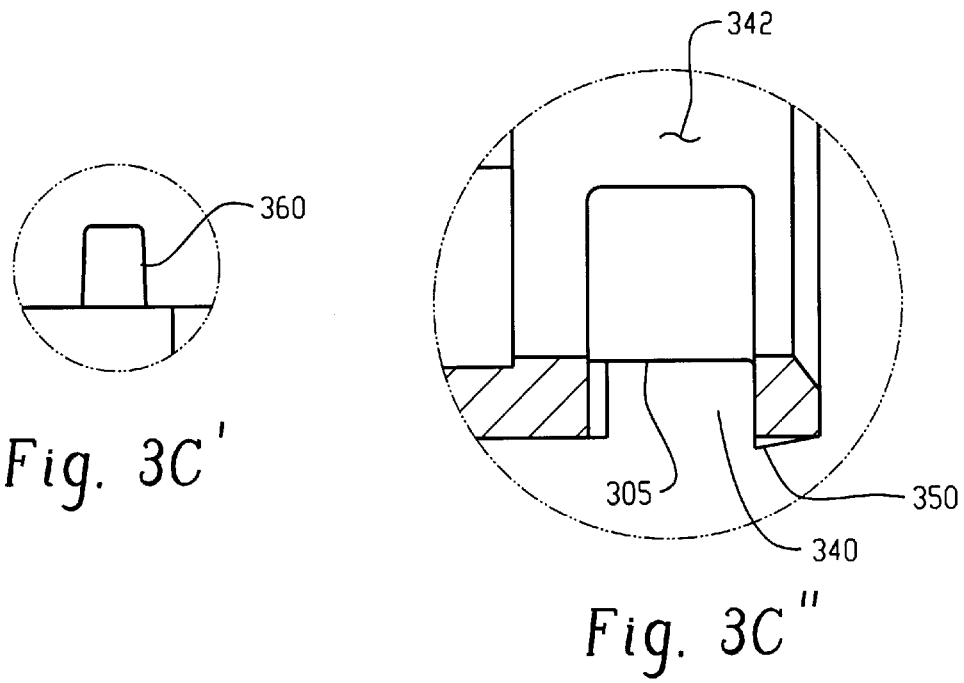
Figure 3E:
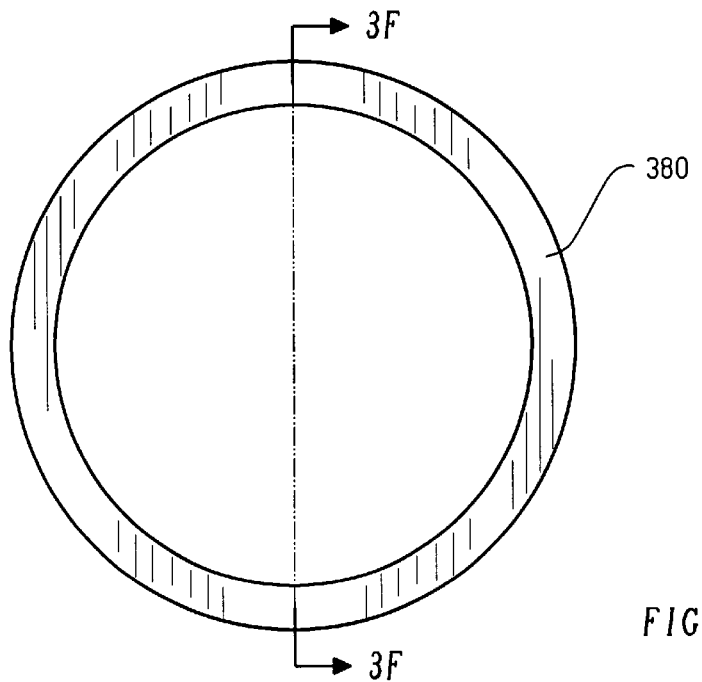
FIG. 3E is a top view of a retaining ring that retains the pair of locking members in place to form a stabilizer elbow lock according to a first embodiment of the present invention.
Figure 3F:
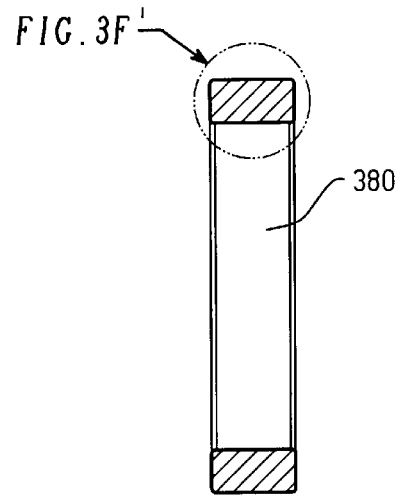
FIG. 3F is a sectional view of the retaining ring shown in FIG. 3E taken along the section line 3F—3F in FIG. 3E, with FIGS. 3F' and 3F" providing additional details thereof.
Figure 3F:
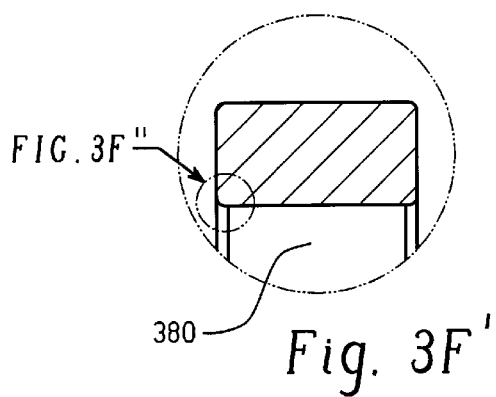
Figure 3F:
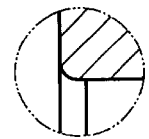

Referring now to FIGS. 3A–3F, locking subassembly ("lock") 300 preferably includes first locking member 310, second locking member 315, and a retaining ring 380. First locking member 310 and second locking member 315, are preferably structurally identical and when engaging locking subassembly 300 with stabilizer elbow 200, one locking member is inverted to face the other locking member (see FIGS. 1, 4A, and 5A). A section of the interior surface of both locking members 310, 315 is shaped to engage and retain the shape of a portion of coupler valve 110. More specifically to the embodiment shown in the figures, the coupler valve 110 shown in the figures includes a hex-nut-shaped portion 115 having six substantially planar faces (hexagonal in cross-section) that allows a wrench to be used to tighten the coupler valve 110 to stabilizer elbow 200. Accordingly, the lock 300 preferably has a hex-nut-shaped inside surface 325 (also having six faces, also hexagonal in cross-section) that engages and retains the nut-shaped portion 115 of the coupler valve 110. In FIGS. 3B, 3C, and 3D each locking member is shown as having four faces 325*a*, 325*b*, 325*c*, and 325*d* that are each oriented 120 degrees from adjacent face(s), which, when assembled with another like locking member, form a hex-nut-shaped opening (they form a cavity that is substantially hexagonal in cross section) to engage the hex-nut-shaped portion 115. Two faces 325*b* and 325*c* are full-sized faces and two faces 325*a* and 325*d* are half-sized faces. These four faces 325*a*, 325*b*, 325*c*, and 325*d* preferably extend from semi-cylindrical surfaces 322, 342. When the two locking members are assembled, the half-sized face 325*a* of one locking member aligns with the half-sized face 325*a* of the other locking member to form a full-sized face. Similarly, the half-sized face 325*d* of one locking member aligns with the half-sized face 325*d* of the other locking member to form a full-sized face. Similarly, when assembled, semi-cylindrical surfaces 322, 342 align to form two cylindrical surfaces, one of which is preferably proximate to and concentric with a cylindrical portion 112 of the valve 110. Steps 324, 344 are preferably proximate to and parallel with ledge 214 to permit a close fit of the locking members to the stabilizer elbow. Locking subassembly 300 cannot be properly engaged if the faces of hex-nut-shaped portion 115 are not properly aligned with respect to locking members 310, 315.

In the embodiment shown in the figures, the stabilizing elbow 200 comprises a pair of stabilizing wings 220. Accordingly, the lock 300 can be shaped to engage and retain the stabilizing wings 220. Thus, both locking members preferably include a first slot 320 near one edge of the locking member and a second slot 340 near the opposite edge of the locking member. These slots 320, 340 preferably pass completely through the material of both locking members. When properly assembled (see FIGS. 4A–4C and 5A–5C), one stabilizing wing 220 is inserted into and passes through second slot 340 of first locking member 310, and the other stabilizing wing 220 is inserted into and passes through first slot 320 of second locking member 315 (see FIGS. 4B and 5B). Insertion of the stabilizing wings 220 into the slots 320, 340 of the locking members allows the locking members 310, 315 to engage and retain the stabilizer elbow 200 and prevents locking subassembly (lock) 300 from rotating around stabilizer elbow 200, and, because the surface 325 engages and retains surface 115 of coupler valve 110, prevents coupler valve 110 from becoming inadvertently loosened or detached from threaded nipple 210 and similarly prevents the seal between the coupler valve 110 and the stabilizer elbow 200 from breaking, thereby preventing water from leaking between the coupler valve 110 and the stabilizer elbow 200.

If the lock 300 comprises two or more separate locking members, the lock preferably comprises some structure to retain the locking members in place and some structure to align the locking members during assembly. Various structures can be used to retain the locking members in place, e.g., locking rings, hinges, band clamps, springs, etc. Various structures can be used to align the locking members during assembly, e.g., peg(s) and cavitie(s); male/female engaging shapes; pins and holes, etc.

As best shown in FIGS. 3B and 3C, both first locking member 310 and second locking member 315 preferably include an alignment peg 360 and an alignment cavity 370 for ensuring proper alignment of the locking members relative to one another when locking subassembly is engaged with stabilizer elbow 200. When the two locking members 310, 315 are brought together facing one another, alignment peg 360 on first locking member 310 enters alignment cavity 370 on second locking member 315. Likewise, alignment peg 360 on second locking member 315 enters alignment cavity 370 on first locking member 310.

A retaining ring is preferably used to retain the locking members in place. As best shown in FIGS. 4B and 5B, retaining ring 380 prevents locking members 310 and 315 from separating from one another once the locking members are engaged with stabilizer elbow 200. Following the proper engagement of the locking members with stabilizer elbow 200, retaining ring 380 is placed over the locking members and snapped into place to secure the locking members to each another. A structure, e.g., a spur, a ridge, a bump, a detent, a rib, etc. located on the retaining ring or the locking members preferably keeps the retaining ring in place. As shown in the figures, each locking member 310, 315 preferably includes some structure to keep the retaining ring 380 in place, e.g., spur 350, which is preferably located just above first slot 320 and just below second slot 340 on each locking member, prevents retaining ring 380 from being easily removed from the locking members. Spurs 350 more preferably extend at an angle of about 10 degrees and rise from a surface to about 0.020 inches above that surface. A plurality of tapered ridges (not shown) can be added on the interior surface of retaining ring 380.

As best shown in FIGS. 3A, 3B, and 3D (see also FIG. 1), both first locking member 310 and second locking member 315 preferably also include an anti-rotational collar 330. When both locking members 310, 315 are properly engaged with stabilizer elbow 200, the anti-rotational collars align with one another and a section of PVC pipe or similar material can be passed through the collars to serve as a stabilization rod (not shown). A length of pipe passing through anti-rotational collars 330 adds positional stability to swing joint assembly 100 once the assembly has been installed as part of an irrigation system. In addition thereto, or in the alternative, the locking members 310, 315 can have other stabilizing structures that add positional stability to the coupler valve 110 and/or the elbow, e.g., stabilizer wings or structures similar to stabilizer wings 220 (with or without apertures 250), arms, extensions, rod holders, etc.

FIG. 4A illustrates the proper method of assembling the lock 300 according to the present invention onto a coupler valve 110 and stabilizer elbow 200. First, coupler valve 110 is attached to the stabilizer elbow 200; typically the coupler valve 110 is tightened to the threaded portion 210 of stabilizer elbow 200 either with a wrench engaging nut portion 115 of coupler valve 110, or a strap wrench or a pipe wrench engaging the body of the coupler valve, while the stabilizer elbow 200 is held in place by hand. In the case of the embodiments shown in the figures, the nut-shaped portion 115 of coupler valve 110 needs to be rotated so as to be aligned substantially as shown in FIG. 4A so that the six faces of nut-shaped portion 115 face the faces 325*a*, 325*b*, 325*c*, and 325*d* of aligned locking members 310, 315. If the nut-shaped portion 115 of coupler valve 110 is not properly aligned, the two locking members 310, 315 might not even be able to touch, let alone properly engage so that retaining ring 380 can be snapped in place. Next, the two locking members 310, 315 are aligned so that the two wings 220 of stabilizer elbow 200 pass through openings 320, 340 and are pushed together so that the peg 360 of each locking member 310, 315 is inserted into the cavity 370 of the other locking member, so that surface 390 of each locking member engages the corresponding surface 390 of the other locking member, and so that surface 395 of each locking member engages the corresponding surface 395 of the other locking member (surfaces 390 and 395 are shown in FIG. 3B), as shown in FIG. 4B. Finally, retaining ring 380 is snapped in place as shown in FIG. 4B and held in place by spur 350 on each locking member 310, 315. Thus, FIG. 4B depicts swing joint assembly 100 in an assembled state (swing arm 120 and street elbow 130 are not shown). FIG. 4C shows the assembly of FIG. 4B with the lock 300 shown in cross-section to show the alignment and proximity of nut-shaped portion 115 of coupler valve 110 with lock 300. In this assembled position, the lock 300, prevents relative motion between the coupler valve 110 and the stabilizer elbow 200 thereby preventing the seal between the coupler valve 110 and the stabilizer elbow 200 from being broken.

In FIGS. 4A–4C, the locking members 310, 315 of lock 300 have surfaces 325a, 325b, 325c, and 325d that prevent the seal between the coupler valve 110 and the stabilizer elbow 200 from being broken by direct engagement of the lock 300 with the coupler valve 110 and by direct engagement of the lock 300 with the stabilizer elbow 200. In the alternative, the lock 300 can prevent the seal between the coupler valve 110 and the stabilizer elbow 200 from being broken by indirect engagement of the lock 300 with the coupler valve 110 and/or by indirect engagement of the lock 300 with the stabilizer elbow 200. For example, it might be beneficial to have a single sized lock 300 that can be used with coupler valves of varying sizes. In this case, one or more adapters 400 can be provided to allow the lock 300 to work with different-sized (or even different-shaped) coupler valves.

Figure 3G:
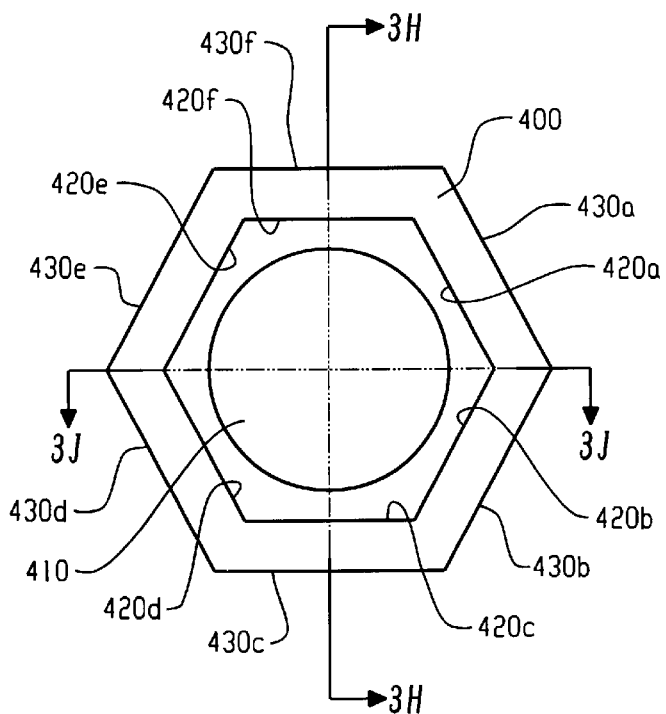
FIG. 3G is a top view of an adapter used to adapt swing joint assemblies of different sizes to the stabilizer elbow lock.
Figure 3H:
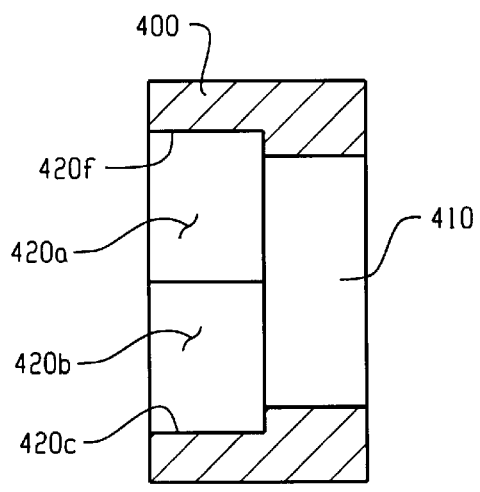
FIG. 3H is a sectional view of the adapter shown in FIG. 3G taken along the section line 3H—3H in FIG. 3G.
Figure 3J:
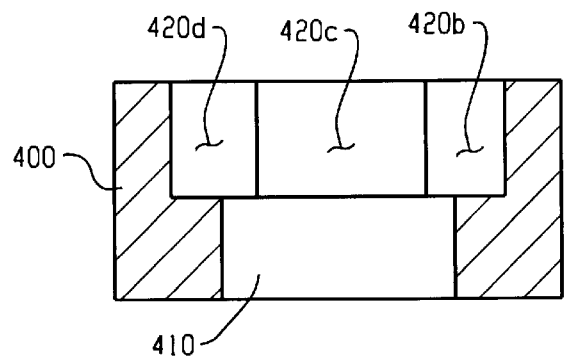
FIG. 3J is a sectional view of the adapter shown in FIG. 3G taken along the section line 3J—3J in FIG. 3G.

FIGS. 3G, 3H, and 3J show an adapter 400 that allows the locking members 310, 315 to be used with a smaller coupler valve 110' having a smaller nut-shaped portion 115' than the nut-shaped portion 115 of larger coupler valve 110. The adapter 400 shown in FIGS. 3G, 3H, and 3J has an opening 410 through which threaded nipple 210' passes, has a plurality of faces 420a–420f that engage and retain the nut-shaped portion 115' of smaller coupler valve 110', and has a plurality of faces 430a–430f that engage the faces 325a, 325b, 325c, and 325d, that, when assembled, prevent the seal between the coupler valve 110' and the stabilizer elbow 200 from being broken. As should be apparent to those skilled in the art from the teachings of this application, numerous differently shaped adapters can be fashioned to allow the locking members 310, 315, and other embodiments of the lock 300 of the present invention, to be used with numerous coupler valves and/or elbows (any elbow, not necessarily a stabilizer elbow 200) with different sizes and shapes, or to engage and retain different portions of thereof.

FIG. 5A illustrates the proper assembly of locking members 310, 315 with an adapter 400. The procedure is virtually the same as set forth in connection with FIG. 4A, except that the adapter 400 is positioned on the nut-shaped portion 115' of smaller coupler valve 110' prior to the coupler valve 110' being tightened to threaded nipple 210' and a strap wrench or pipe wrench or the like must be used to tighten the smaller coupler valve 110' to the stabilizer elbow 200'. FIG. 5B depicts swing joint assembly 100 in an assembled state (swing arm 120 and street elbow 130 are not shown). FIG. 5C shows the assembly of FIG. 5B with the lock 300 and adapter 400 shown in cross-section to show the alignment and proximity of nut-shaped portion 115' of coupler valve 110 with adapter 400, and to show the alignment and proximity of adapter 400 with lock 300. In this assembled position, the lock 300, via the adapter 400, prevents relative motion between the coupler valve 110' and the stabilizer elbow 200 thereby preventing the seal between the coupler valve 110' and the stabilizer elbow 200 from being broken.

It is to be understood by those skilled in the art that the entire assembly shown in FIGS. 1, 4B and 5B is typically covered by earth or similar material, or enclosed in a valve box, with the upper-most portion of the coupler valve 110 being located near the surface of the earth to allow easy access thereto; thus the final installation step for the procedure in FIG. 4A and the procedure in 5A is typically covering the assembly with earth or similar material or enclosing the assembly in a valve box.

Threaded nipple 210 is preferably made of brass, and the remaining components of stabilizer elbow 200, locking members 310, 315 and the retaining ring 380, are preferably made of plastic or polymer, e.g., PVC. Brass nipple 210 can be held in place in the body of stabilizer elbow 200, by molding it in place, e.g., by cutting slots or holes in the end of the nipple 210 that is to be embedded in the stabilizer elbow 200 allowing plastic to flow into them and securing the brass nipple in the plastic elbow. However, in alternate implementations, threaded nipple 210 is made of plastic, polymer, stainless steel, or any other suitable metal. Likewise, in alternate implementations, the other components of swing joint assembly 100 are manufactured from stainless steel, copper, or any other suitable material or materials. All the parts can be manufactured using standard manufacturing processes, e.g., injection molding of the plastic/polymer (e.g., PVC) parts.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. For example, the lock 300 (and/or the adapter 400) need not necessarily engage either the coupler valve 110 or the elbow (any elbow, not necessarily a stabilizer elbow 200) (or even the adapter 400) when initially assembled; the lock 300 of the present invention can engage the coupler valve 110 and elbow as there is relative motion between the two. As a specific example, with the embodiments shown in the figures, the faces 325a, 325b, 325c, and 325d can be positioned and aligned so that there is a very small clearance (e.g., 0.005 to 0.015 inches) between those surfaces and the nut-shaped portion 115 when initially assembled. Then, as the coupler valve 110 is moved relative to the elbow in a manner that would tend to disconnect the coupler valve 110 from the elbow (and/or break the seal between the two), at some point in that motion of the coupler valve 110 relative to the elbow, one or more of the faces 325a, 325b, 325c, and 325d would engage the nut-shaped portion 110, preventing further motion of the coupler valve 110 relative to the elbow and preventing the seal between the two from being broken. As another example, the lock 300 is shown as being formed of two locking members 310, 315; in the alternative, the lock 300 might be formed of a single piece or more than two pieces. As yet another example, the locking members 310, 315 are shown as engaging the nut-shaped portion 115 of coupler valve 110 and the stabilizer wings 220 of stabilizer elbow 200; in the alternative, the lock 300 can be shaped to engage a different portion of coupler valve 110 and/or a different portion of the elbow (any elbow, not necessarily a stabilizer elbow 200). As another example, the lock 300 is shown as being formed of locking members 310, 315 that are separate from both the coupler valve and the elbow. In the alternative, the lock 300 of the present invention can be formed of locking members affixed to (e.g., rigidly affixed to or flexibly affixed to or hingedly affixed to) either the coupling valve, or the elbow, or both the coupling valve and the elbow. As yet another example, the locking members 310, 315 shown are shaped to engage and retain existing structures on the coupler valve 110 and the stabilizer elbow 200; in the alternative, additional structures can be added to or taken away from (e.g., adding apertures) to the coupler valve or the elbow to provide structures to which the lock 300 can engage to prevent the seal from being broken. As a final example, the lock 300 of the present invention can be shaped to lock a coupler valve to different fittings, e.g., a "T" fitting, a star fitting, a tapped pipe, a female elbow, a female stabilizer elbow, etc. Therefore, the invention in its broader aspects is not limited to the specific details, representative apparatus and methods, and illustrative examples shown and described. Accordingly, departures may be made from such details without departing from the spirit or scope of the applicant's general inventive concept.

What is claimed is:

1. A lock to prevent a seal between a coupler valve and a fitting from being broken, the coupler valve having at least one coupler valve surface and the fitting having at least one fitting surface, comprising: at least one locking member having a first portion shaped to engage at least a portion of the at least one coupler valve surface and a second portion shaped to engage at least a portion of the at least one fitting surface, said first and second portions cooperating to prevent relative motion between the coupler valve and the fitting sufficient to break the seal between the coupler valve and the fitting and wherein said at least one locking member comprises a plurality of substantially identical locking members, each of said plurality of substantially identical locking members having said first and second portions.

2. A lock to prevent a seal between a coupler valve and a fitting from being broken according to claim 1 wherein the coupler valve has at least one substantially planar face and further wherein said first portion of said at least one locking member is shaped to engage the at least one substantially planar face of the coupler valve to prevent relative motion between the coupler valve and the fitting sufficient to break the seal between the coupler valve and the fitting.

3. A lock to prevent a seal between a coupler valve and a fitting from being broken according to claim 1 wherein one end of the coupler valve is hex-nut-shaped in that the one end has six outwardly-facing, substantially planar faces that are oriented substantially like the six faces of a hex-nut, and further wherein said first portion of said at least one locking member is shaped to engage at least a portion of the hex-nut-shaped end of the coupler valve to prevent relative motion between the coupler valve and the fitting sufficient to break the seal between the coupler valve and the fitting.

4. A lock to prevent a seal between a coupler valve and a fitting from being broken according to claim 1 wherein said at least one locking member comprises at least one stabilizing structure that adds positional stability to the combination of the coupler valve, the fitting, and the lock when covered by earth or similar material.

5. A lock to prevent a seal between a coupler valve and a fitting from being broken according to claim 1 wherein said at least one locking member comprises at least one collar affixed thereto that accepts a length of pipe that adds positional stability to the combination of the coupler valve, the fitting, and the lock when covered by earth or similar material.

6. A lock to prevent a seal between a coupler valve and a fitting from being broken, the coupler valve having at least one coupler valve surface and the fitting having at least one fitting surface, comprising: at least one locking member having a first portion shaped to engage at least a portion of the at least one coupler valve surface and a second portion shaped to engage at least a portion of the at least one fitting surface, said first and second portions cooperating to prevent relative motion between the coupler valve and the fitting sufficient to break the seal between the coupler valve and the fitting, wherein said at least one locking member comprises two substantially identical locking members, each having a first portion shaped to engage at least a portion of the at least one coupler valve surface and a second portion shaped to engage at least a portion of the at least one fitting surface, said first and second portions cooperating to prevent relative motion between the coupler valve and the fitting sufficient to break the seal between the coupler valve and the fitting.

7. A lock to prevent a seal between a coupler valve and a fitting from being broken according to claim 6 wherein said two substantially identical locking members are held together by a locking ring.

8. A lock to prevent a seal between a coupler valve and a fitting from being broken according to claim 7 wherein said two substantially identical locking members each further comprise a projection to prevent said locking ring from readily being removed from a position in which said two substantially identical locking members are held together by said locking ring.

9. A lock to prevent a seal between a coupler valve and a fitting from being broken according to claim 8 wherein said projection of each said two substantially identical locking members comprises a ramp positioned to prevent said locking ring from readily being removed from a position in which said two substantially identical locking members are held together by said locking ring.

10. A lock to prevent a seal between a coupler valve and a fitting from being broken according to claim 6 wherein each of said two substantially identical locking members comprise at least one stabilizing structure that adds positional stability to the combination of the coupler valve, the fitting, and the lock when covered by earth or similar material.

11. A lock to prevent a seal between a coupler valve and a fitting from being broken according to claim 6 wherein each of said two substantially identical locking members comprise at least one collar affixed thereto, said collars of said two substantially identical locking members aligning with each other to accept a length of pipe that adds positional stability to the combination of the coupler valve, the fitting, and the lock when covered by earth or similar material.

12. A lock to prevent a seal between a coupler valve and a fitting from being broken, the coupler valve having at least one coupler valve surface and the fitting having at least one fitting surface, comprising:

at least two substantially identical locking members having a first portion shaped to engage at least a portion of the at least one coupler valve surface and a second portion shaped to engage at least a portion of the at least one fitting surface, said first and second portions of each of said locking members cooperating to prevent relative motion between the coupler valve and the fitting sufficient to break the seal between the coupler valve and the fitting;

wherein one end of the coupler valve is hex-nut-shaped in that the one end has six outwardly-facing, substantially planar faces that are oriented substantially like the six faces of a hex-nut, and further wherein said first portions of said locking members are shaped to engage at least a portion of the hex-nut-shaped end of the coupler valve to prevent relative motion between the coupler valve and the fitting sufficient to break the seal between the coupler valve and the fitting;

wherein said two substantially identical locking members are held together by a locking ring;

wherein said two substantially identical locking members each further comprise a ramp positioned to prevent said locking ring from readily being removed from a position in which said two substantially identical locking members are held together by said locking ring; and wherein each of said two substantially identical locking members comprise at least one collar affixed thereto, said collars of said two substantially identical locking members aligning with each other to accept a length of pipe that adds positional stability to the coupler valve when installed.

13. A lock to prevent a seal between a coupler valve and a fitting from being broken, the coupler valve having at least one coupler valve surface and the fitting having at least one fitting surface, comprising:

(a) an adapter having at least one adapter surface; and (b) at least one locking member having a first portion shaped to engage at least a portion of the at least one adapter surface and a second portion shaped to engage at least a portion of the at least one fitting surface; and (c) said adapter having a first portion shaped to engage at least a portion of the at least one coupler valve surface; and (d) said adapter and said first and second portions of said at least one locking member cooperating to prevent relative motion between the coupler valve and the fitting sufficient to break the seal between the coupler valve and the fitting.

14. A lock to prevent a seal between a coupler valve and a stabilizer elbow from being broken, the coupler valve having at least one nut-shaped portion and the stabilizer elbow having at least one stabilizer structure extending therefrom, comprising:

(a) a first locking member having a first portion shaped to engage the at least one nut-shaped portion of the coupler valve and a second portion having an opening through which at least one stabilizer structure of the stabilizer elbow extends;

(b) a second locking member having a first portion shaped to engage the at least one nut-shaped portion of the coupler valve and a second portion having an opening through which at least one stabilizer structure of the stabilizer elbow extends; and (c) a retaining ring for engaging said first locking member and said second locking member allowing said first and second locking members to cooperate to prevent relative rotational motion between the coupler valve and the stabilizer elbow sufficient to break the seal between the coupler valve and the stabilizer elbow.

15. A lock to prevent a seal between a coupler valve and a stabilizer elbow from being broken according to claim 14 wherein at least one of said first and second locking members comprises at least one stabilizing structure that adds positional stability to the coupler valve when installed.

16. A lock to prevent a seal between a coupler valve and a stabilizer elbow from being broken according to claim 14 wherein said first portions of said first and second locking members each have at least three faces sequentially arranged and oriented at about 120 degrees with respect to an adjacent face to engage the at least one nut-shaped portion of the coupler valve.

17. A lock to prevent a seal between a coupler valve and a stabilizer elbow from being broken according to claim 14 wherein said first portions of said first and second locking members each have at least four faces sequentially arranged and oriented at about 120 degrees with respect to an adjacent face to engage the at least one nut-shaped portion of the coupler valve, with two adjacent faces of said four faces being about twice as large as the remaining two of said four faces.

18. A lock to prevent a seal between a coupler valve and a fitting from being broken according to claim 14 wherein said first and second locking members are two substantially identical locking members.

19. A lock to prevent a seal between a coupler valve and a fitting from being broken according to claim 18 wherein said two substantially identical locking members each further comprise a projection to prevent said locking ring from readily being removed from a position in which said two substantially identical locking members are held together by said locking ring.

20. A lock to prevent a seal between a coupler valve and a fitting from being broken according to claim 19 wherein said projection of each said two substantially identical locking members comprises a ramp positioned to prevent said locking ring from readily being removed from a position in which said two substantially identical locking members are held together by said locking ring.

21. A lock to prevent a seal between a coupler valve and a fitting from being broken according to claim 18 wherein each of said two substantially identical locking members comprise at least one collar affixed thereto, said collars of said two substantially identical locking members aligning with each other to accept a length of pipe that adds positional stability to the coupler valve when installed.

22. A lock to prevent a seal between a coupler valve and a stabilizer elbow from being broken, the coupler valve having at least one nut-shaped valve portion and the stabilizer elbow having at least one stabilizer structure extending therefrom, comprising:

(a) an adapter having at least one nut-shaped adapter portion and further having a first portion shaped to engage at least a portion of the at least one nut-shaped valve portion of the coupler valve;

(b) a first locking member having a first portion shaped to engage the at least one nut-shaped adapter portion of said adapter and a second portion having an opening through which at least one stabilizer structure of the stabilizer elbow extends;

(c) a second locking member having a first portion shaped to engage the at least one nut-shaped adapter portion of said adapter and a second portion having an opening through which at least one stabilizer structure of the stabilizer elbow extends; and (d) a retaining ring for engaging said first locking member and said second locking member allowing said adapter and said first and second locking members to cooperate to prevent relative rotational motion between the coupler valve and the stabilizer elbow sufficient to break the seal between the coupler valve and the stabilizer elbow.

23. A lock to prevent a seal between a coupler valve and a stabilizer elbow from being broken, the coupler valve having at least one nut-shaped portion and the stabilizer elbow having at least one stabilizer structure extending therefrom, comprising:

(a) a first locking member having a first portion shaped to engage the at least one nut-shaped portion of the coupler valve and a second portion having an opening through which at least one stabilizer structure of the stabilizer elbow extends;

(b) a second locking member having a first portion shaped to engage the at least one nut-shaped portion of the coupler valve and a second portion having an opening through which at least one stabilizer structure of the stabilizer elbow extends; and (c) a retaining ring for engaging said first locking member and said second locking member allowing said first and second locking members to cooperate to prevent relative rotational motion between the coupler valve and the stabilizer elbow sufficient to break the seal between the coupler valve and the stabilizer elbow; and (d) wherein said first and second locking members are two substantially identical locking members;

(e) wherein said first portions of said first and second locking members each have at least four faces sequentially arranged and oriented at about 120 degrees with respect to an adjacent face to engage the at least one nut-shaped portion of the coupler valve, with two adjacent faces of said four faces being about twice as large as the remaining two of said four faces;

(f) wherein said two substantially identical locking members each further comprise a ramp positioned to prevent said locking ring from readily being removed from a position in which said two substantially identical locking members are held together by said locking ring; and (g) wherein each of said two substantially identical locking members comprise at least one collar affixed thereto, said collars of said two substantially identical locking members aligning with each other to accept a length of pipe that adds positional stability to the coupler valve when installed.

24. A lock to prevent a seal between a coupler valve and a stabilizer elbow from being broken, the coupler valve having at least one nut-shaped valve portion and the stabilizer elbow having at least one stabilizer structure extending therefrom, comprising:

(a) an adapter having at least one nut-shaped adapter portion and further having a first portion shaped to engage at least a portion of the at least one nut-shaped valve portion of the coupler valve;

(b) a first locking member having a first portion shaped to engage the at least one nut-shaped adapter portion of said adapter and a second portion having an opening through which at least one stabilizer structure of the stabilizer elbow extends;

(c) a second locking member having a first portion shaped to engage the at least one nut-shaped adapter portion of said adapter and a second portion having an opening through which at least one stabilizer structure of the stabilizer elbow extends; and (d) a retaining ring for engaging said first locking member and said second locking member allowing said adapter and said first and second locking members to cooperate to prevent relative rotational motion between the coupler valve and the stabilizer elbow sufficient to break the seal between the coupler valve and the stabilizer elbow; and (e) wherein said first and second locking members are two substantially identical locking members;

(f) wherein said first portions of said first and second locking members each have at least four faces sequentially arranged and oriented at about 120 degrees with respect to an adjacent face to engage the at least one nut-shaped portion of the coupler valve, with two adjacent faces of said four faces being about twice as large as the remaining two of said four faces;

(g) wherein said two substantially identical locking members each further comprise a ramp positioned to prevent said locking ring from readily being removed from a position in which said two substantially identical locking members are held together by said locking ring; and (h) wherein each of said two substantially identical locking members comprise at least one collar affixed thereto, said collars of said two substantially identical locking members aligning with each other to accept a length of pipe that adds positional stability to the coupler valve when installed.

25. In a stabilizer elbow of the type having an externally threaded portion, an internally threaded portion, and at least one stabilizing wing, the improvement comprising: a projection extending from the at least one stabilizing wing, said projection positioned on the at least one stabilizing wing to hold a locking member in place to thereby facilitate securing the locking member directly to another locking member.

26. The improved stabilizer elbow according to claim 25 wherein said projection comprises a section of a sphere positioned on the at least one stabilizing wing to hold the locking member in place to thereby facilitate securing the locking member directly to the other locking member.

27. A method of preventing a seal between a coupler valve and a stabilizer elbow from being broken, comprising the steps of:

(a) providing a coupler valve having at least one nut-shaped valve portion;

(b) providing an improved stabilizer elbow having an externally threaded portion, an internally threaded portion, and first and second stabilizing wings;

(c) providing first and second locking members each having a first portion shaped to engage the at least one nut-shaped portion of the coupler valve and a second portion having an opening through which respective stabilizing wings of the stabilizer elbow extend;

(d) inserting the first stabilizing wing into the opening of the first locking member past at least one projection extending from the first stabilizing wing, said at least one projection positioned on the first stabilizing wing to hold the first locking member in place to thereby facilitate securing the first locking member to the second locking member;

(e) inserting the second stabilizing wing into the opening of the second locking member past at least one projection extending from the second stabilizing wing, said at least one projection positioned on the second stabilizing wing to hold the second locking member in place to thereby facilitate securing the first locking member to the second locking member;

(f) providing a retaining ring; and (g) slipping the retaining ring over the first and second locking members to cause the first and second locking members to cooperate to prevent relative rotational motion between the coupler valve and the stabilizer elbow sufficient to break the seal between the coupler valve and the stabilizer elbow.

28. A lock to prevent a seal between a coupler valve and a fitting from being broken, the coupler valve having at least one coupler valve surface and the fitting having at least one fitting surface, comprising: at least one locking member having a first portion shaped to engage at least a portion of the at least one coupler valve surface and a second portion shaped to engage at least a portion of the at least one fitting surface, said first and second portions cooperating to prevent relative motion between the coupler valve and the fitting sufficient to break the seal between the coupler valve and the fitting, wherein said at least one locking member comprises at least one stabilizing structure that adds positional stability to the combination of the coupler valve, the fitting, and the lock when covered by earth or similar material.

29. A lock to prevent a seal between a coupler valve and a fitting from being broken according to claim 28 wherein the coupler valve has at least one substantially planar face and further wherein said first portion of said at least one locking member is shaped to engage the at least one substantially planar face of the coupler valve to prevent relative motion between the coupler valve and the fitting sufficient to break the seal between the coupler valve and the fitting.

30. A lock to prevent a seal between a coupler valve and a fitting from being broken according to claim 28 wherein one end of the coupler valve is hex-nut-shaped in that the one end has six outwardly-facing, substantially planar faces that are oriented substantially like the six faces of a hex-nut, and further wherein said first portion of said at least one locking member is shaped to engage at least a portion of the hex-nut-shaped end of the coupler valve to prevent relative motion between the coupler valve and the fitting sufficient to break the seal between the coupler valve and the fitting.

31. A lock to prevent a seal between a coupler valve and a fitting from being broken, the coupler valve having at least one coupler valve surface and the fitting having at least one fitting surface, comprising: at least one locking member having a first portion shaped to engage at least a portion of the at least one coupler valve surface and a second portion shaped to engage at least a portion of the at least one fitting surface, said first and second portions cooperating to prevent relative motion between the coupler valve and the fitting sufficient to break the seal between the coupler valve and the fitting, wherein said at least one locking member comprises at least one collar affixed thereto that accepts a length of pipe that adds positional stability to the combination of the coupler valve, the fitting, and the lock when covered by earth or similar material.

32. A lock to prevent a seal between a coupler valve and a fitting from being broken according to claim 31 wherein the coupler valve has at least one substantially planar face and further wherein said first portion of said at least one locking member is shaped to engage the at least one substantially planar face of the coupler valve to prevent relative motion between the coupler valve and the fitting sufficient to break the seal between the coupler valve and the fitting.

33. A look to prevent a seal between a coupler valve and a fitting from being broken according to claim 31 wherein one end of the coupler valve is hex-nut-shaped in that the one end has six outwardly-facing, substantially planar faces that are oriented substantially like the six faces of a hex-nut, and further wherein said first portion of said at least one locking member is shaped to engage at least a portion of the hex-nut-shaped end of the coupler valve to prevent relative motion between the coupler valve and the fitting sufficient to break the seal between the coupler valve and the fitting.

* * * * *

UNITED STATES PATENT AND TRADEMARK OFFICE
CERTIFICATE OF CORRECTION

PATENT NO. : 6,709,020 B2  Page 1 of 1
DATED : March 23, 2004
INVENTOR(S) : Larry Workman and David Allen McAllister It is certified that error appears in the above-identified patent and that said Letters Patent is hereby corrected as shown below:

Column 16,
Line 20, please delete "look;" and insert -- lock --.

Signed and Sealed this

Twenty-fifth Day of May, 2004

JON W. DUDAS
*Acting Director of the United States Patent and Trademark Office*